(12) United States Patent
Teng et al.

(10) Patent No.: US 12,303,774 B2
(45) Date of Patent: May 20, 2025

(54) TRIGGER DEVICE AND INTERACTIVE TERMINAL HAVING SAME

(71) Applicant: GOERTEK INC., Shandong (CN)

(72) Inventors: Xuefang Teng, Shandong (CN); Yanlong Liu, Shandong (CN); Dong Liang, Shandong (CN); Lin Geng, Shandong (CN); Xing Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 342 days.

(21) Appl. No.: 17/904,974

(22) PCT Filed: Oct. 30, 2020

(86) PCT No.: PCT/CN2020/125102
§ 371 (c)(1),
(2) Date: Aug. 25, 2022

(87) PCT Pub. No.: WO2021/169362
PCT Pub. Date: Sep. 2, 2021

(65) Prior Publication Data
US 2023/0115146 A1   Apr. 13, 2023

(30) Foreign Application Priority Data
Feb. 27, 2020   (CN) .......................... 202010125771.9

(51) Int. Cl.
*A63F 13/24* (2014.01)
*A63F 13/285* (2014.01)

(52) U.S. Cl.
CPC ............ *A63F 13/24* (2014.09); *A63F 13/285* (2014.09); *A63F 2300/1037* (2013.01); *A63F 2300/1043* (2013.01)

(58) Field of Classification Search
CPC ................... A63F 13/24; A63F 13/285; A63F 2300/1037; A63F 2300/1043
See application file for complete search history.

(56) References Cited

U.S. PATENT DOCUMENTS 8,894,491 B2 * 11/2014 Grant .................... A63F 13/235
463/36
9,174,134 B1 * 11/2015 Grant ...................... G06F 3/016
(Continued)

FOREIGN PATENT DOCUMENTS

CN         104863438 A     8/2015
CN         205119933 U     3/2016
(Continued)

*Primary Examiner* — Omkar A Deodhar
*Assistant Examiner* — S N H
(74) *Attorney, Agent, or Firm* — LKGlobal | Lorenz & Kopf, LLP

(57) ABSTRACT

A trigger device and an interactive terminal having the same are disclosed. The trigger device includes, but is not limited to, a trigger bracket and a trigger movably arranged on the trigger bracket, and further includes: a trigger electromagnet, which is fixed on the trigger; a bracket electromagnet, which is fixed on the trigger bracket, and has an effect of attracting or repulsing with the trigger electromagnet in a pressed state; an electromagnetic control device, which is connected to an electromagnetic coil of the trigger electromagnet and the electromagnetic coil of the bracket electromagnet respectively, and is configured to adjust the voltage or current of the electromagnetic coil of the trigger electromagnet and the electromagnetic coil of the bracket electromagnet.

18 Claims, 2 Drawing Sheets

(56) References Cited

U.S. PATENT DOCUMENTS

| | | | |
|---|---|---|---|
| 2016/0175711 A1* | 6/2016 | Billington | G08B 6/00 340/407.2 |
| 2016/0193529 A1* | 7/2016 | Burgess | A63F 13/24 463/37 |
| 2017/0001108 A1* | 1/2017 | Burgess | A63F 13/22 |
| 2017/0151494 A1* | 6/2017 | Ironmonger | H01H 21/24 |

FOREIGN PATENT DOCUMENTS

| | | |
|---|---|---|
| CN | 205363536 U | 7/2016 |
| CN | 105843384 A | 8/2016 |
| CN | 107551538 A | 1/2018 |
| CN | 108506287 A | 9/2018 |
| CN | 111330262 A | 6/2020 |
| JP | H10232737 A | 9/1998 |

* cited by examiner

TRIGGER DEVICE AND INTERACTIVE TERMINAL HAVING SAME

CROSS-REFERENCE TO RELATED APPLICATION

This Application is a U.S. National-Stage entry under 35 U.S.C. § 371 based on International Application No. PCT/CN2020/125102, filed Oct. 30, 2020 which was published under PCT Article 21(2) and which claims priority to Chinese Application No. 202010125771.9, filed Feb. 27, 2020, which are all hereby incorporated herein in their entirety by reference.

TECHNICAL FIELD

This application pertains to the technical field of control terminals, in particular to a trigger device. In addition, the present disclosure also relates to an interactive terminal having the same.

BACKGROUND

With the progress of society and the development of network technology, more and more games have been developed and favored by people. As a game apparatus, interactive gamepad has become an indispensable operating device for players.

The main function of the ordinary gamepad is to realize the operation functions of the game, such as controlling the direction, marching, jumping, weapon launching, etc., but the most important thing of the game is to provide players with an immersive gaming experience. In the traditional solution, the trigger of the gamepad relies on the spring to provide the return elasticity, the force feedback is simple, and the user's game experience is poor.

To sum up, how to provide users with a rich trigger operation experience is an urgent problem to be solved by those skilled in the art. In addition, other objects, desirable features and characteristics will become apparent from the subsequent summary and detailed description, and the appended claims, taken in conjunction with the accompanying drawings and this background.

SUMMARY

In view of this, the purpose of the present disclosure is to provide a trigger device, which can realize the adjustment of the trigger rebound effect through electronic control, and has a better use experience effect.

Another purpose of the present disclosure is to provide an interactive terminal having the trigger device.

In order to achieve the above purpose, the present disclosure provides the following technical solutions:

A trigger device, comprising a trigger bracket and a trigger movably arranged on the trigger bracket, further comprising:
  a trigger electromagnet, which is fixed on the trigger;
  a bracket electromagnet, which is fixed on the trigger bracket, and has an effect of attracting or repulsing with the trigger electromagnet in a pressed state;
  an electromagnetic control device, which is connected to the electromagnetic coil of the trigger electromagnet and the electromagnetic coil of the bracket electromagnet respectively, and is configured to adjust the voltage or current of the electromagnetic coil of the trigger electromagnet and the electromagnetic coil of the bracket electromagnet.

Preferably, the trigger is provided with a groove or a fixing member configured to fix the trigger electromagnet; Alternatively, an adhesive fixing device is provided on the trigger to fix the trigger electromagnet.

Preferably, the number of turns of the electromagnetic coil of the trigger electromagnet is the same as the number of turns of the electromagnetic coil of the bracket electromagnet, and the size of the trigger electromagnet and the bracket electromagnet are the same.

Preferably, when the trigger is fully pressed, the trigger electromagnet and the bracket electromagnet are arranged in parallel with a gap.

Preferably, the trigger is a fan-shaped structure, the first side of the fan-shaped structure is a fixing surface of the trigger electromagnet, and the second side opposite to the first side is a pressing operation surface of the trigger.

Preferably, the trigger is hinged on the trigger bracket, and a non-hinged end of the trigger is connected to the trigger bracket through a torsion spring sleeved on a hinge shaft, and the two ends of the torsion spring are connected to the trigger bracket and the trigger respectively.

Preferably, the pressing operation surface is provided with anti-skid patterns.

Preferably, the electromagnetic control device independently adjusts the electromagnetic coil of the trigger electromagnet and the electromagnetic coil of the bracket electromagnet.

Preferably, the electromagnetic control device is provided with a receiving device configured to receive an external adjustment signal.

An interactive terminal includes a trigger device, wherein the trigger device is any one of the trigger devices described above.

In the trigger device provided by the present disclosure, the electromagnetic control device is used to adjust the current of the electromagnetic coil in the trigger electromagnet and the electromagnetic coil of the bracket electromagnet, change the magnetic force received by the trigger electromagnet, and change the rebound force received by the trigger, so as to provide users with different trigger feedback forces, thereby providing user with different tactile sensations based on different game environments. The present disclosure also provides an interactive terminal including the above trigger device.

BRIEF DESCRIPTION OF DRAWINGS

The present invention will hereinafter be described in conjunction with the following drawing figures, wherein like numerals denote like elements, and.

Wherein, 1: trigger, 2: bracket electromagnet, 3: trigger electromagnet, 4: electromagnetic coil.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative efforts shall fall within the protection scope of the present disclosure.

The purpose of the present disclosure is to provide a trigger device, which can realize the adjustment of the trigger rebound effect through electronic control, and has a better use experience effect.

Another purpose of the present disclosure is to provide an interactive terminal having the above trigger device.

Figure 1:
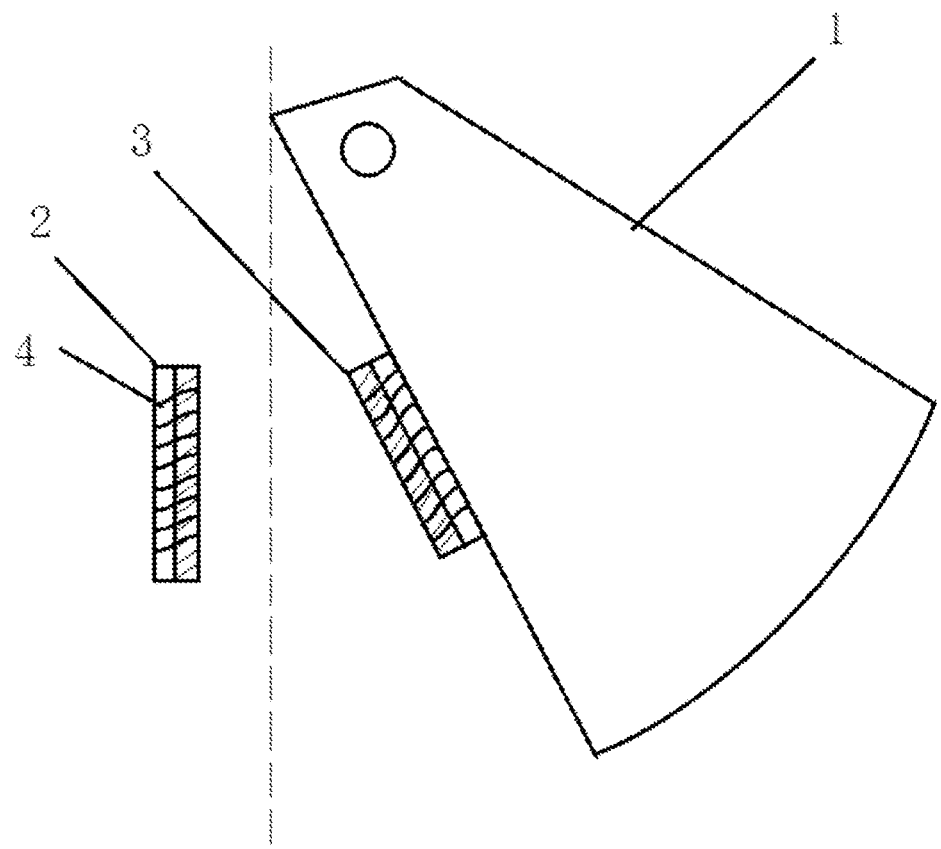
FIG. 1 is a schematic diagram of a trigger reset state in the trigger device provided by the present disclosure.
Figure 2:
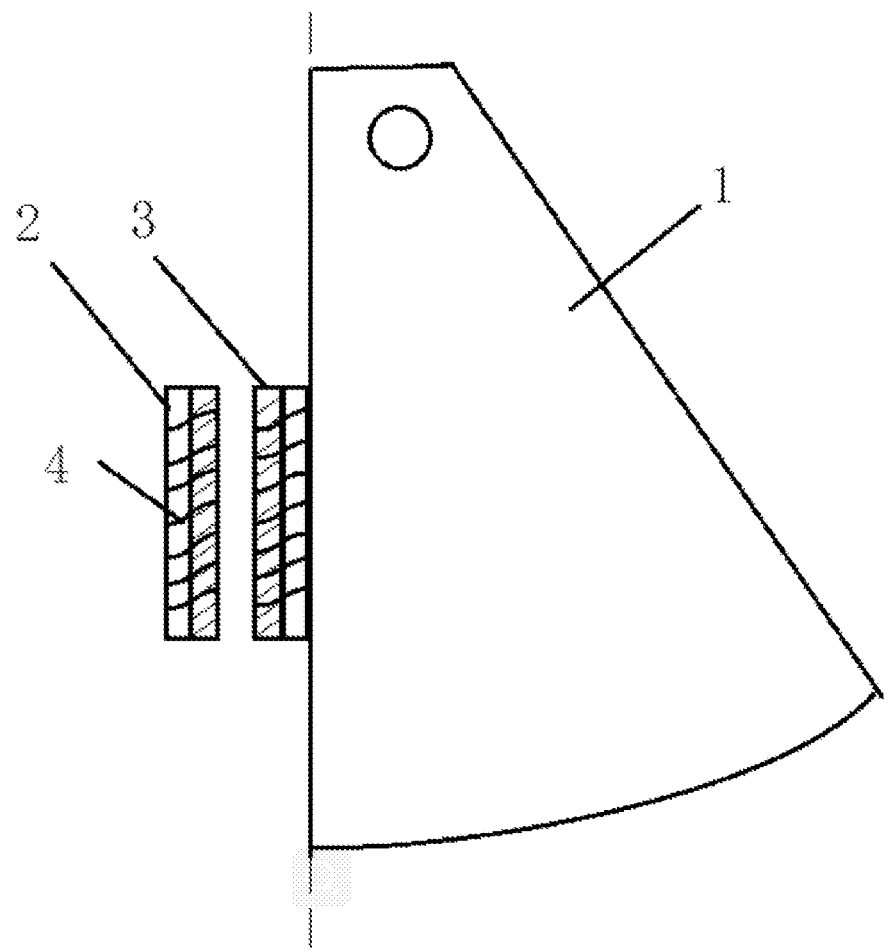
FIG. 2 is a schematic diagram of the trigger being fully pressed in the trigger device provided by the present disclosure.

Referring to FIG. 1 and FIG. 2, FIG. 1 is a schematic diagram of a trigger reset state in the trigger device provided by the present disclosure, and FIG. 2 is a schematic diagram of the trigger being fully pressed in the trigger device provided by the present disclosure.

The present disclosure provides a trigger device, which is mainly used on a handle of a gamepad or an interactive somatosensory device, so as to realize the control and adjustment of the use experience of the trigger 1. The trigger device includes a trigger bracket and a trigger 1 movably arranged on the trigger bracket, and further includes:

a trigger electromagnet 3, which is fixed on the trigger 1;
a bracket electromagnet 2 which is fixed on the trigger bracket, and has an effect of attracting or repulsing with the trigger electromagnet 3 in a pressed state;
an electromagnetic control device which is connected to the electromagnetic coil 4 of the trigger electromagnet 3 and the electromagnetic coil 4 of the bracket electromagnet 2 respectively, and is configured to adjust the voltage or current of the electromagnetic coil 4 of the trigger electromagnet 3 and the electromagnetic coil 4 of the bracket electromagnet 2.

The trigger bracket is usually arranged in an interactive terminal. For example, the interactive terminal can be a handle, and is used to set the trigger 1. The trigger 1 can make a motion such as rotation or movement relative to the trigger bracket, referring to the prior art. In the present disclosure, the trigger bracket can be fixed in the interactive terminal, or can be movably fixed in the interactive terminal.

The trigger 1 is movably arranged on the trigger bracket. When pressed by an external force, the trigger 1 can move relative to the trigger bracket. The trigger electromagnet 3 is fixed on the trigger 1, and the bracket electromagnet 2 is fixed on the trigger bracket. The electromagnetic control device can supply current to the electromagnetic coil 4 of the trigger electromagnet 3 and the electromagnetic coil 4 of the bracket electromagnet 2 to make them magnetic, and maintain the magnetic properties. The bracket electromagnet 2 and the trigger electromagnet 3 have a magnetic relationship of mutual attraction or mutual repulsion.

After the electromagnetic control device supplies current to the electromagnetic coil 4 of the trigger electromagnet 3 and the electromagnetic coil 4 of the bracket electromagnet 2, a magnetic force of mutual attraction or mutual repulsion is generated between the two electromagnets. At the same time, the electromagnetic control device can adjust the magnitude of the current or the magnitude of the voltage in the electromagnetic coil 4 of the trigger electromagnet 3 and the electromagnetic coil 4 of the bracket electromagnet 2, thereby changing the magnetic force of the two electromagnets.

Take the repulsive magnetic force generated by the two electromagnets after supplying current as an example. When the repulsive force between the two electromagnets is reduced by the electromagnetic control device, the force acting on the trigger electromagnet 3 is reduced. For the trigger 1 that has been pressed and the force removed, the trigger electromagnet 3 will be reset at a relatively slower speed and a smaller force due to the reduced repulsive force, so as to provide the operator's hand a relatively weakened rebound force. Conversely, the rebound strength increases.

In the trigger device provided by the present disclosure, the electromagnetic control device is used to adjust the current in the electromagnetic coil 4 of the trigger electromagnet 3 and the electromagnetic coil 4 of the bracket electromagnet 2, to change the magnetic force received by the trigger electromagnet 3, and to change the rebound force received by the trigger 1, so as to provide users with different trigger feedback forces, thereby providing users with different tactile sensations based on different game environments.

On the basis of the above embodiment, the trigger 1 is provided with a groove or a fixing member for fixing the trigger electromagnet 3. Alternatively, an adhesive fixing device is provided on the trigger 1 for fixing the trigger electromagnet 3.

It should be noted that the trigger 1 may be provided with a groove, a convex structure for fixing, or other structures for fixing, wherein the shape of the groove is preferably the same as that of the trigger electromagnet 3. Preferably, an adhesive fixing device can be provided on the trigger 1, to connect the trigger electromagnet 3 by means of adhesive, so that the fixing effect is more stable.

Optionally, a fixing member, such as a clip or a fixing screw, may also be provided on the trigger 1.

On the basis of the above embodiment, the number of turns of the electromagnetic coil 4 of the trigger electromagnet 3 is the same as the number of turns of the electromagnetic coil 4 of the bracket electromagnet 2, and the size of the trigger electromagnet 3 and the bracket electromagnet 2 are the same.

It should be noted that the size of the two electromagnets is the same, and the number of turns and the winding method of the coils on the two electromagnets is the same, so that the two electromagnets have the same characteristics, which is convenient for the unified control in electromagnetic control device.

On the basis of any one of the above embodiments, when the trigger 1 is fully pressed, the trigger electromagnet 3 and the bracket electromagnet 2 are arranged in parallel with a gap.

Referring to FIG. 2, FIG. 2 is a schematic diagram of the trigger being fully pressed in the trigger device provided by the present disclosure. When the trigger 1 is pressed and reaches a fully pressed state, the trigger electromagnet 3 and the bracket electromagnet 2 are in a parallel state. In a specific embodiment, the same poles of the two electromagnets are arranged opposite to each other, and the two electromagnets are arranged in parallel, so that a mutually repulsive magnetic force is generated by the opposite arrangement of the same poles. When fully pressed, there is a gap between the trigger electromagnet 3 and the bracket electromagnet 2 to avoid collision between the two electromagnets.

On the basis of the above embodiment, the trigger 1 is a fan-shaped structure. The first side of the fan-shaped structure is a fixing surface of the trigger electromagnet, and the second side opposite to the first side is a pressing operation surface of the trigger 1.

Referring to FIG. 1 and FIG. 2, the trigger 1 can be a fan-shaped structure or an arc surface structure. The two radial surfaces of the fan-shaped structure are a first side surface and a second side surface respectively. The first side surface is used to fix the trigger electromagnet 3, and is called the fixing surface of the trigger electromagnet. The second side is the side used to be pressed by the operator. Preferably, the second side is provided with anti-skid patterns that can be lines or curves, so as to avoid the operator's pressing operation from slipping.

On the basis of any of the above embodiments, the trigger 1 is hinged on the trigger bracket, and the non-hinged end of the trigger 1 is connected to the trigger bracket through a torsion spring. The torsion spring is sleeved on the hinge shaft, and the two ends of the torsion spring are connected to the trigger bracket and the trigger 1 respectively.

In a specific embodiment, the electromagnetic control device independently adjusts the electromagnetic coil 4 of the trigger electromagnet 3 and the electromagnetic coil 4 of the bracket electromagnet 2.

It should be noted that the electromagnetic control device controls the trigger electromagnet 3 and the bracket electromagnet 2 through two separate control circuits, and the voltages and currents of the two electromagnets may be different, so that the electromagnetic forces generated by the two electromagnets may be different.

In a specific embodiment, the electromagnetic control device is provided with a receiving device used to receive an external adjustment signal.

The interactive terminal needs to realize different trigger feedback experiences according to the game content or the current scene. Therefore, the electromagnetic control device adjusts the bracket electromagnet 2 according to the current game content or the current scene. The electromagnetic control device can obtain the required state in real time. Alternatively, Corresponding control states are pre-stored in the electromagnetic control device. That is to say, the control device needs to be provided with a corresponding signal receiving device, so as to receive the signal including the adjustment instruction in real time to adjust the bracket electromagnet 2. Of course, the control device may also be provided with a storage device, that is, a certain adjustment instruction is pre-stored.

In addition to the main structure of the trigger device provided in any of the above embodiments, the present disclosure also provides an interactive terminal having the above trigger device. The interactive terminal comprises a housing, a control device such as a motherboard built in the housing, and the above trigger device. Specifically, the trigger 1 is provided outside the interactive terminal. The interactive terminal may be a device such as a gamepad, a somatosensory device, or the like. For the structure of other parts of the interactive terminal, referring to the prior art, which will not be repeated herein.

The various embodiments in this specification are described in a progressive manner. Each embodiment focuses on the differences from other embodiments, and the same and similar parts between the various embodiments can be referred to each other.

The trigger device and the interactive terminal provided by the present disclosure have been described in detail above. The principles and implementations of the present disclosure are described herein by using specific examples. The descriptions of the above embodiments are only used to help to understand the method and the core idea of the present disclosure. It should be pointed out that for those skilled in the art, without departing from the principle of the present disclosure, several improvements and modifications can also be made, and these improvements and modifications also fall within the protection scope of the claims of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A trigger device, comprising a trigger bracket and a trigger (1) movably arranged on the trigger bracket, further comprising:
    a trigger electromagnet (3), which is fixed on the trigger (1);
    a bracket electromagnet (2), which is fixed on the trigger bracket, and has an effect of attracting or repulsing with the trigger electromagnet (3) in a pressed state;
    an electromagnetic control device, which is connected to the electromagnetic coil (4) of the trigger electromagnet (3) and the electromagnetic coil (4) of the bracket electromagnet (2) respectively, and is configured to adjust the voltage or current of the electromagnetic coil (4) of the trigger electromagnet (3) and the electromagnetic coil (4) of the bracket electromagnet (2),
    wherein the number of turns of the electromagnetic coil (4) of the trigger electromagnet (3) is the same as the number of turns of the electromagnetic coil (4) of the bracket electromagnet (2), and the size of the trigger electromagnet (3) and the bracket electromagnet (2) are the same,
    when the trigger (1) is fully pressed, the trigger electromagnet (3) and the bracket electromagnet (2) are arranged in parallel with a gap.

2. The trigger device according to claim 1, wherein the trigger (1) is provided with a groove or a fixing member configured to fix the trigger electromagnet (3);
    or an adhesive fixing device is provided on the trigger (1) to fix the trigger electromagnet (3).

3. The trigger device according to claim 2, wherein the electromagnetic control device independently adjusts the electromagnetic coil (4) of the trigger electromagnet (3) and the electromagnetic coil (4) of the bracket electromagnet (2).

4. An interactive terminal, comprising a trigger device, wherein the trigger device is the trigger device according to claim 2.

5. The trigger device according to claim 1, wherein the trigger (1) is a fan-shaped structure, the first side of the fan-shaped structure is a fixing surface of the trigger electromagnet, and the second side opposite to the first side is a pressing operation surface of the trigger (1).

6. The trigger device according to claim 5, wherein the trigger (1) is hinged on the trigger bracket, and a non-hinged end of the trigger (1) is connected to the trigger bracket through a torsion spring sleeved on a hinge shaft, and the two ends of the torsion spring are connected to the trigger bracket and the trigger (1) respectively.

7. An interactive terminal, comprising a trigger device, wherein the trigger device is the trigger device according to claim 6.

8. The trigger device according to claim 5, wherein the pressing operation surface is provided with anti-skid patterns.

9. The trigger device according to claim 5, wherein the electromagnetic control device independently adjusts the electromagnetic coil (4) of the trigger electromagnet (3) and the electromagnetic coil (4) of the bracket electromagnet (2).

10. An interactive terminal, comprising a trigger device, wherein the trigger device is the trigger device according to claim 5.

11. The trigger device according to claim 1, wherein the electromagnetic control device independently adjusts the electromagnetic coil (4) of the trigger electromagnet (3) and the electromagnetic coil (4) of the bracket electromagnet (2).

12. The trigger device according to claim 11, wherein the electromagnetic control device is provided with a receiving device configured to receive an external adjustment signal.

13. An interactive terminal, comprising a trigger device, wherein the trigger device is the trigger device according to claim 11.

14. An interactive terminal, comprising a trigger device, wherein the trigger device is the trigger device according to claim 1.

15. The trigger device according to claim 1, wherein the electromagnetic control device independently adjusts the electromagnetic coil (4) of the trigger electromagnet (3) and the electromagnetic coil (4) of the bracket electromagnet (2).

16. The trigger device according to claim 1, wherein the electromagnetic control device independently adjusts the electromagnetic coil (4) of the trigger electromagnet (3) and the electromagnetic coil (4) of the bracket electromagnet (2).

17. An interactive terminal, comprising a trigger device, wherein the trigger device is the trigger device according to claim 1.

18. An interactive terminal, comprising a trigger device, wherein the trigger device is the trigger device according to claim 1.

* * * * *